(12) United States Patent
Berggren (10) Patent No.: US 10,159,182 B2
(45) Date of Patent: Dec. 25, 2018

(54) LATERAL TILT CONTROL SYSTEM FOR AN AGRICULTURAL HARVESTER

(71) Applicant: CNH Industrial America, LLC, New Holland, PA (US)

(72) Inventor: Michael Berggren, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/404,643

(22) Filed: Jan. 12, 2017

(65) Prior Publication Data

US 2018/0192587 A1    Jul. 12, 2018

(51) Int. Cl.
| | |
|---|---|
| *A01D 41/14* | (2006.01) |
| *A01B 63/02* | (2006.01) |
| *A01B 63/10* | (2006.01) |
| *A01D 41/06* | (2006.01) |
| *A01D 75/28* | (2006.01) |
| *A01F 7/06* | (2006.01) |

(52) U.S. Cl.
CPC .......... *A01D 41/141* (2013.01); *A01B 63/023* (2013.01); *A01B 63/10* (2013.01); *A01D 41/06* (2013.01); *A01D 75/285* (2013.01); *A01D 75/287* (2013.01); *A01F 7/06* (2013.01)

(58) Field of Classification Search
CPC .. A01D 41/145; A01D 41/141; A01D 34/283; A01D 75/28; A01D 75/285; A01D 75/287; A01D 41/06; F15B 21/005; F15B 21/08; F15B 21/087; A01B 63/023; A01B 63/10; A01F 7/06
USPC .............. 56/10.2 E, 10.2 R, 208, 209; 460/8
See application file for complete search history.

(56) References Cited

U.S. PATENT DOCUMENTS

| | | | |
|---|---|---|---|
| 3,008,724 | A | 11/1961 | Lapins et al. |
| 3,703,298 | A | 11/1972 | Laverda |
| 4,050,704 | A | 9/1977 | Duca et al. |
| 4,183,195 | A | 1/1980 | James |

(Continued)

FOREIGN PATENT DOCUMENTS

| | | |
|---|---|---|
| EP | 1522215 A1 | 4/2005 |
| EP | 3072382 A1 | 9/2016 |

OTHER PUBLICATIONS

European Search Report for European Application No. 18150869.8, dated May 15, 2018 (6 pages).

*Primary Examiner* — Robert E Pezzuto
(74) *Attorney, Agent, or Firm* — Peter K. Zacharias; Patrick M. Sheldrake (57) ABSTRACT

A lateral tilt control system for an agricultural harvester may include first and second tilt cylinders coupled between a support structure and an implement of the harvester. The first tilt cylinder may include a first cap-side chamber and a first rod-side chamber and the second tilt cylinder may include a second cap-side chamber and a second rod-side chamber. The system may also include a first fluid line providing a flow path between the first cap-side chamber and the second rod-side chamber and a second fluid line providing a flow path between the first rod-side chamber and the second cap-side chamber. Additionally, the system may include a pressure relief valve coupled between the first and second fluid lines to allow fluid to be transferred between the first and second fluid lines when a fluid pressure within either fluid line exceeds a relief pressure setting.

19 Claims, 5 Drawing Sheets

(56) References Cited

U.S. PATENT DOCUMENTS

| | | | |
|---|---|---|---|
| 4,229,932 A | | 10/1980 | Persoons et al. |
| 4,594,840 A | | 6/1986 | D'Almeida et al. |
| 4,776,153 A | | 10/1988 | DePauw et al. |
| 4,845,931 A | | 7/1989 | Brunér et al. |
| 5,415,586 A | | 5/1995 | Hanson et al. |
| 5,535,577 A | | 7/1996 | Chmielewski et al. |
| 5,964,077 A | * | 10/1999 | Guinn ................ A01D 41/14 56/10.2 E |
| 7,603,837 B2 | * | 10/2009 | Ehrhart ............. A01D 34/283 56/10.2 E |
| 7,707,811 B1 | * | 5/2010 | Strosser ............ A01D 41/141 56/10.2 E |
| 8,079,204 B2 | | 12/2011 | Coers et al. |
| 8,554,425 B2 | | 10/2013 | Otto et al. |
| 9,717,180 B2 | * | 8/2017 | Teach ................ A01D 41/145 |
| 2011/0283673 A1 | | 11/2011 | Moersch et al. |

\* cited by examiner

LATERAL TILT CONTROL SYSTEM FOR AN AGRICULTURAL HARVESTER

FIELD OF THE INVENTION

The present subject matter relates generally to agricultural harvesters and, more particularly, to an improved lateral tilt control system for controlling the lateral orientation of a header or other harvesting implement of an agricultural harvester.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine; and/or the like. To address such issues, many current combines utilizes an automatic header height and tilt control system to maintain a constant cutting height above the ground regardless of the ground contour or ground position relative to the base combine. For instance, it is known to utilize electronically controlled tilt cylinders to automatically adjust the lateral orientation or tilt of the header relative to the ground based on sensor measurements. However, such systems often exhibit significant lag and slow response times, particularly when the harvester is operating at high ground speeds. As a result, these systems are not equipped to adjust the lateral orientation of the header sufficiently fast enough to account for quickly changing ground contours and/or ground positions.

Accordingly, an improved lateral tilt control system for an agricultural harvester that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a lateral tilt control system for an agricultural harvester including a support structure and an implement pivotally coupled to the support structure. The system may include first and second tilt cylinders coupled between the support structure and the implement. The first tilt cylinder may include a first cap-side chamber and a first rod-side chamber and the second tilt cylinder may include a second cap-side chamber and a second rod-side chamber. The system may also include a first fluid line providing a flow path between the first cap-side chamber of the first tilt cylinder and the second rod-side chamber of the second tilt cylinder and a second fluid line providing a flow path between the first rod-side chamber of the first tilt cylinder and the second cap-side chamber of the second tilt cylinder. Additionally, the system may include a pressure relief valve coupled between the first and second fluid lines. The pressure relief valve may be configured to be opened to allow fluid to be transferred between the first and second fluid lines when a fluid pressure within one of the first fluid line or the second fluid line exceeds a relief pressure setting associated with the pressure relief valve.

In another aspect, the present subject matter is directed to a lateral tilt control system for an agricultural harvester including a support structure and an implement pivotally coupled to the support structure. The system may include a tilt cylinder coupled between the support structure and the implement, with the tilt cylinder including a cap-side chamber and a rod-side chamber. Additionally, the system may include a pressurized fluid source in fluid communication with the tilt cylinder, a first fluid line providing a flow path between the cap-side chamber of the tilt cylinder and the pressurized fluid source, and a second fluid line providing a flow path between the rod-side chamber of the tilt cylinder and the pressurized fluid source. The system may also include a pressure relief valve coupled between the first and second fluid lines. The pressure relief valve may be configured to be opened to allow fluid to be transferred between the first and second fluid lines when a fluid pressure within one of the first fluid line or the second fluid line exceeds a relief pressure setting associated with the pressure relief valve.

In a further aspect, the present subject matter is directed to an agricultural harvester including a feeder, a header pivotally coupled to the feeder, and a lateral tilt control system configured to allow the header to pivot relative to the feeder to adjust a lateral orientation of the header. The lateral control system may include first and second tilt cylinders coupled between the support structure and the implement. The first tilt cylinder may include a first cap-side chamber and a first rod-side chamber and the second tilt cylinder may include a second cap-side chamber and a second rod-side chamber. The lateral control system may also include a first fluid line providing a flow path between the first cap-side chamber of the first tilt cylinder and the second rod-side chamber of the second tilt cylinder and a second fluid line providing a flow path between the first rod-side chamber of the first tilt cylinder and the second cap-side chamber of the second tilt cylinder. Additionally, the lateral control system may include a pressure relief valve coupled between the first and second fluid lines. The pressure relief valve may be configured to be opened to allow fluid to be transferred between the first and second fluid lines when a fluid pressure within one of the first fluid line or the second fluid line exceeds a relief pressure setting associated with the pressure relief valve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved lateral tilt control system for an agricultural harvester that provides for improved system responsiveness in allowing a harvesting implement of the harvester (e.g., a header) pivot relative to its associated support structure (e.g., a feeder of the harvester). Specifically, in several embodiments, the system may include first and second tilt cylinders coupled between the header and the feeder of the harvester, with the tilt cylinders being hydraulically coupled in parallel via a fluid circuit of the system. For instance, in one embodiment, the fluid circuit may include both a first fluid line coupled between a cap-side chamber of the first tilt cylinder and a rod-side chamber of the second tilt cylinder and a second fluid line coupled between a rod-side chamber of the first tilt cylinder and a cap-side chamber of the second tilt cylinder. In addition, the system may, in several embodiments, include an electronically controlled pressure relief valve coupled between the first and second fluid lines. In such an embodiment, when the fluid pressure within one of the fluid lines exceeds the relief pressure setting associated with the pressure relief valve, the valve may be opened to allow fluid to be transferred from the high pressure line to the low pressure line.

As will be described below, the disclosed system may be utilized to implement a free-float or passive control mode in which the header is allowed to "float" relative to the ground and tilt laterally to accommodate changes in the contour or elevation of the ground. As a result, the lateral orientation of the header may be adjusted without any significant lag in the control system, thereby increasing the system's overall responsiveness to quickly changing ground contours and/or elevations. Moreover, when implementing the passive control mode, the relief pressure setting for the pressure relief valve may be adjusted, as desired by the operator, to vary the "float" sensitivity or spring rate of the system.

Figure 1:
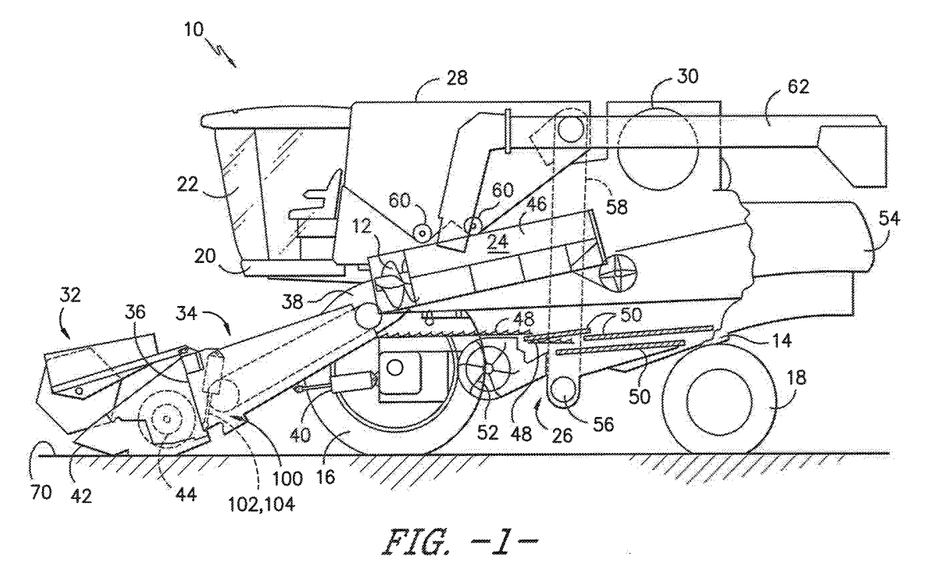
FIG. 1 illustrates a simplified, partial sectional side view of one embodiment of an agricultural combine in accordance with aspects of the present subject matter.
Figure 2:
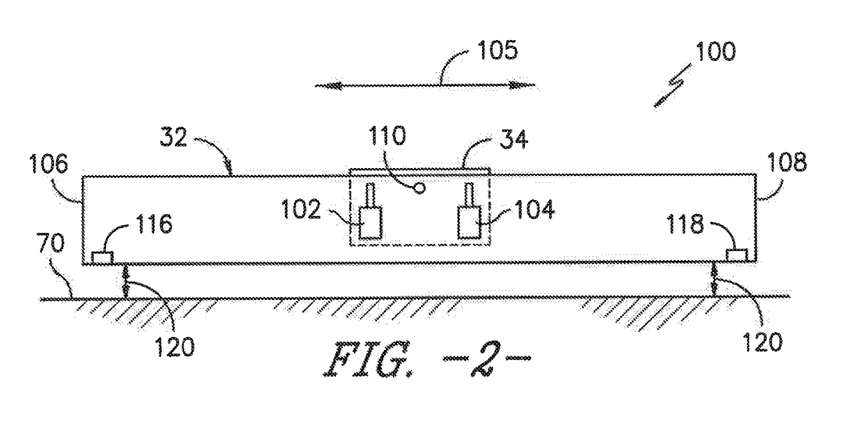
FIG. 2 illustrates a simplified, schematic view of one embodiment of a lateral tilt control system for an agricultural harvester in accordance with aspects of the present subject matter.

Referring now to the drawings, FIG. 1 illustrates a simplified, partial sectional side view of one embodiment of an agricultural harvester 10 in accordance with aspects of the present subject matter. As shown, the harvester 10 is configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. Additionally, an operator's platform 20 with an operator's cab 22, a threshing and separating assembly 24, a grain cleaning assembly 26, a holding tank 28 and an engine 30 may be supported by the frame 14. Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 extend between a forward end 36 coupled to the header 32 and a rear end 38 positioned adjacent to the threshing and separating assembly 24. As is generally understood, the rear end 38 of the feeder 34 may be pivotally coupled to a portion of the harvester 10 to allow the forward end 36 of the feeder 34 and, thus, the header 32 to be moved upwardly and downwardly relative to the ground 70 to set the desired harvesting or cutting height for the header 32. For instance, as shown in FIG. 2, one or more height control cylinders 40 may be coupled to the feeder 34 to allow the header 32 to be raised and lowered relative to the ground.

As the harvester 10 is propelled forwardly over a field with standing crop, the latter is severed from the stubble by a sickle bar 42 at the front of the header 32 and delivered by a header auger 44 to the forward end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a lateral tilt control system 100 that is configured to adjust a lateral orientation or tilt of the header 32 relative to the ground 70 so as to maintain the desired cutting height between the header 32 and the ground 70 across the entire width of the header 32. As will be described below, the lateral tilt control system 100 may include first and second tilt cylinders 102, 104 coupled between the header 32 and the feeder 34 to allow the header 32 to be tilted or otherwise pivoted laterally or side-to-side relative to the feeder 34. As such, the tilt cylinders 102, 104 may allow the header 34 to pivot relative to the feeder 34 to accommodate differences in the elevation or contour of the ground 70 across the width of the header 34.

Figure 3:
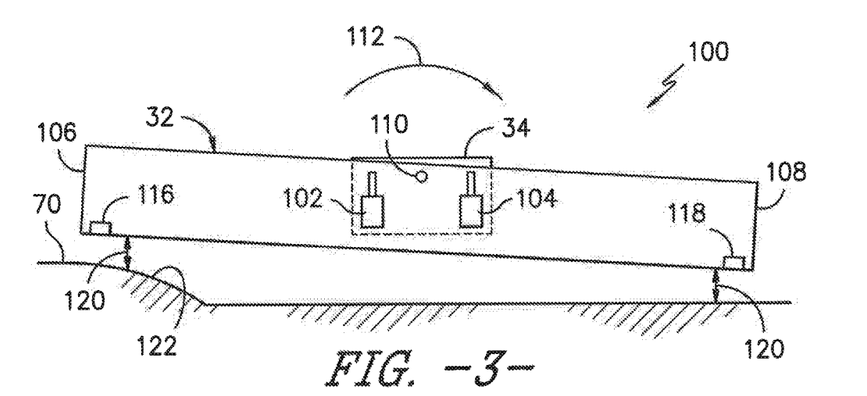
FIG. 3 illustrates another schematic view of the lateral tilt control system shown in FIG. 2, particularly illustrating the header of the harvester pivoted relative to the feeder of the harvester in a first direction.
Figure 4:
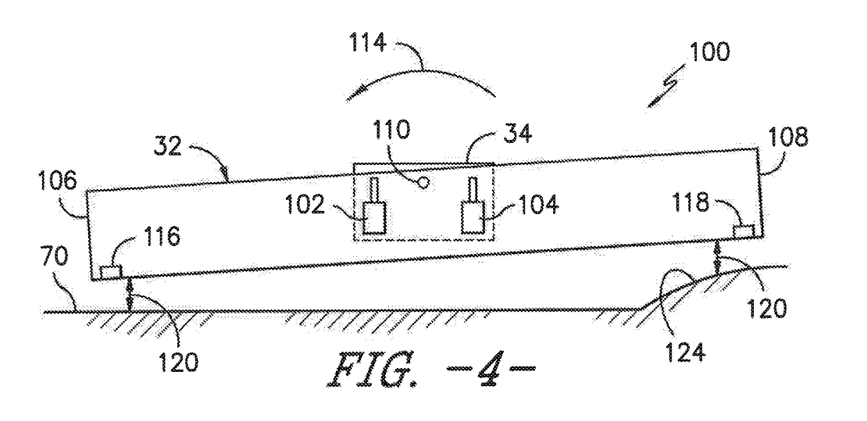
FIG. 4 illustrates yet another schematic view of the lateral tilt control system shown in FIG. 2, particularly illustrating the header pivoted relative to the feeder in a second direction opposite the first direction.

Referring now to FIGS. 2-4, simplified, schematic views of one embodiment of the lateral tilt control system 100 described above with reference to FIG. 1 is illustrated in accordance with aspects of the present subject matter. As shown, the header 32 may generally extend side-to-side or in a lengthwise direction (indicated by arrow 105 in FIG. 2) between a first lateral end 106 and a second lateral end 108. Additionally, the header 32 may be pivotally coupled to the feeder 32 at a pivot point 110 defined at a central location of the header 34 between its first and second lateral ends 106, 108 to allow the header 32 to tilt or pivot laterally relative to the feeder in both a first direction (e.g., as indicated by arrow 112 in FIG. 3) and an opposite section direction (e.g., as indicated by arrow 114 in FIG. 3).

As indicated above, the lateral tilt control system 100 may include first and second tilt cylinders 102, 104. For instance, as shown in the illustrated embodiment, a first tilt cylinder 102 may be coupled between the header 32 and the feeder 34 along one lateral side of the pivot point 110 and a second tilt cylinder 104 may be coupled between the header 32 and the feeder 32 along the opposed lateral side of the pivot point 110. In general, when the lateral tilt control system 100 is operating in an active control mode, the operation of the tilt cylinders 102, 104 may be configured to be actively controlled (e.g., via an associated controller) to adjust the lateral orientation of the header 32 relative to the ground 70. For instance, one or more height sensors 116, 118 may be provided on the header 32 to monitor a local distance or height 120 defined between the header 32 and the ground 70. Specifically, as shown in FIGS. 2-4, a first height sensor 116 may be provided at or adjacent to the first lateral end 106 of the header 32 and a second height sensor 118 may be provided at or adjacent to the second lateral end 108 of the header 32. In such an embodiment, when one of the height sensors 116, 118 detects that the local height 120 defined between the header 32 and the ground 70 differs from a desired height (or falls outside a desired height range), the tilt cylinders 116, 118 may be actively controlled so as to adjust the lateral orientation of the header 33 in a manner that maintains the header 32 located at the desired height (or within the desired height range) relative to the ground 70.

For example, as shown in FIG. 3, when a portion of the header 34 adjacent to the first lateral end 106 passes over a raised section 122 of the ground 70, the reduction in the height 120 defined between the header 32 and the ground 70 may be detected (e.g., via the first height sensor 116). The tilt cylinders 102, 104 may then be actively controlled to adjust the lateral orientation of the header 32 in a manner that pivots the header 32 relative to the feeder 34 about the pivot point 110 in the first direction 112 such that the first lateral end 106 is raised relative to the ground 70. Similarly, as shown in FIG. 4, when a portion of the header 34 adjacent to the second lateral end 108 passes over a raised section 124 of the ground 70, the reduction in the height 120 defined between the header 32 and the ground 70 may be detected (e.g., via the second height sensor 118). The tilt cylinders 102, 104 may then be actively controlled to adjust the lateral orientation of the header 32 in a manner that pivots the header 32 relative to the feeder 34 about the pivot point 110 in the second direction 114 such that the second lateral end 108 is raised relative to the ground 70 It should be appreciated that, in combination with the active control of the operation of the tilt cylinders 102, 104, the operation of the height control cylinder(s) 40 may also be actively controlled to ensure that the header 33 is maintained at the desired height (and/or within the desired height range) relative to the ground 70.

Additionally, as will be described in greater detail below, the lateral tilt control system 100 may also be configured to be operated in a free-float or passive control mode. In such an operating mode, the active control of the tilt cylinders 102, 104 may be stopped and the header 32 may be allowed to freely "float" or tilt relative to the ground 70, thereby permitting the header 32 to pivot based on changes in the contour or elevation of the ground 70. For instance, when the header 32 passes over a raised section 122, 124 of the ground 70 such that a portion of the header 32 contacts the ground 70 along either side of the pivot point 110 and a sufficient moment force is applied through the header 32, the header 32 may be allowed to pivot freely about the pivot point 110 to reduce or alleviate the loading on the header 32. In such instance, the fluid circuit associated with tilt cylinders 102, 104 may allow hydraulic fluid to be transferred between opposed chambers of the cylinders 102, 104 in a manner to accommodate such pivoting of the header 32.

Figure 5:
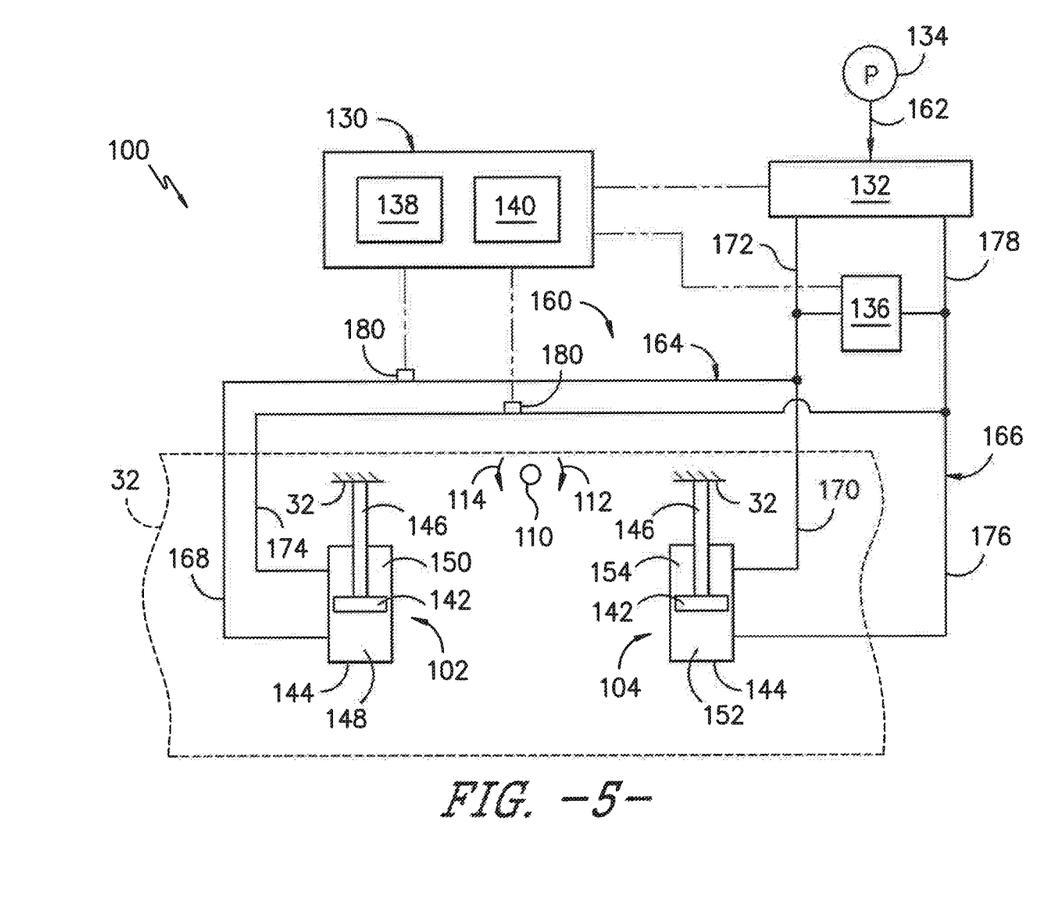
FIG. 5 illustrates a more detailed, schematic view of one embodiment of a lateral tilt control system for an agricultural harvester in accordance with aspects of the present subject matter.

Referring now to FIG. 5, a more detailed, schematic view of one embodiment of the lateral tilt control system 100 described above with reference to FIGS. 2-4 is illustrated in accordance with aspects of the present subject matter. As shown, the system 100 may include a controller 130 configured to electronically control the operation of one more other components of the system 100. Specifically, as will be described below, the controller 130 may be configured to control the operation of one more control valves 132 for regulating the flow of hydraulic fluid supplied from an associated pressurized fluid source (e.g., a suitable pump 134) to the tilt cylinders 102, 104. In addition, the controller 130 may be configured to control the operation of a pressure relief valve 136 based on a corresponding relief pressure setting associated with the valve 136, thereby allowing the "float" sensitivity or spring rate of the system 100 to be adjusted as desired.

In general, the controller 130 may correspond to any suitable processor-based device known in the art, such as a computing device or any suitable combination of computing devices. Thus, in several embodiments, the controller 130 may include one or more processor(s) 138 and associated memory device(s) 140 configured to perform a variety of computer-implemented functions. As used herein, the term "processor" refers not only to integrated circuits referred to in the art as being included in a computer, but also refers to a controller, a microcontroller, microcomputer, a programmable logic controller (PLC), an application specific integrated circuit, and other programmable circuits. Additionally, the memory device(s) 140 of the controller 130 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 130 to perform various computer-implemented functions, such as one or more aspects of the control functionality described herein. In addition, the controller 130 may also include various other suitable components, such as a communications circuit or module, one or more input/output channels, a data/control bus and/or the like.

It should be appreciated that the controller 130 may correspond to an existing controller of the associated harvester 10 or the controller 130 may correspond to a separate processing device. For instance, in one embodiment, the controller 130 may form all or part of a separate plug-in module that may be installed within the harvester 10 to allow the present subject matter to be implemented without requiring additional software to be uploaded onto existing control devices of the harvester 10.

As shown in FIG. 5, each tilt cylinder 102, 104 may include a piston 142 encased within an associated cylinder housing 144 and a piston rod 146 extending outwardly from the housing 144. In one embodiment, to couple the tilt cylinders 102, 104 between the header 32 and the feeder 34, one of the housing 144 or the piston rod 146 of each tilt cylinder 102, 104 may be coupled to the header 32, with the other of the housing 144 or the piston rod 146 being coupled to the feeder 34. Additionally, each cylinder 102, 104 may define opposed cylinder chambers along either side of its piston 142. For instance, as shown in FIG. 5, the first tilt cylinder 102 may include both a first cap-side chamber 148 and a first rod-side chamber 150. Similarly, the second tilt cylinder 104 may include a second cap-side chamber 152 and a second rod-side chamber 154.

Moreover, as shown in the illustrated embodiment, the system 100 may also include a fluid circuit 160 providing a fluid coupling or path between the pump 134 and the tilt cylinders 102, 104. For instance, as shown in FIG. 5, the pump 134 may be fluidly coupled to the control valve(s) 132 via one or more pump lines 162 to allow pressurized hydraulic fluid to be supplied from the pump 134 to the control valve(s) 132. Additionally, the control valve(s) 132 may be fluidly coupled to the first and second tilt cylinders 102, 104 via first and second fluid lines 164, 166. For instance, as shown in FIG. 5, the first fluid line 164 may be configured to provide a fluid path between the control valve(s) 132 and opposite chambers of the first and second tilt cylinders 102, 104. Specifically, the first fluid line 164 may include a first cap-side leg 168 that provides a flow path between the control valve(s) 132 and the cap-side chamber 148 of the first tilt cylinder 102 and a first rod-side leg 170 that provides a flow path between the control valve(s) 132 and the rod-side chamber 154 of the second tilt cylinder 104, with the first cap-side and rod-side legs 168, 170 being fluidly coupled to the control valve(s) 132 via a first valve leg 172 of the first fluid line 164. Similarly, as shown in FIG. 5, the second fluid line 166 may be configured to provide a fluid path between the control valve(s) 132 and the remaining opposite chambers of the first and second tilt cylinders 102, 104. Specifically, the second fluid line 166 may include a second rod-side leg 174 that provides a flow path between the control valve(s) 132 and the rod-side chamber 150 of the first tilt cylinder 102 and a second cap-side leg 176 that provides a flow path between the control valve(s) 132 and the cap-side chamber 152 of the second tilt cylinder 104, with the second rod-side and cap-side legs 174, 176 being fluidly coupled to the control valve(s) 132 via a second valve leg 178 of the second fluid line 166.

Additionally, as indicated above, the system 100 may also include a pressure relief valve 136 provided in fluid communication with the fluid circuit 160. Specifically, as shown in FIG. 5, the pressure relief valve 136 may be fluidly coupled between the first and second fluid lines 164, 166, such as by coupling the pressure relief valve 136 between the first and second valve legs 172, 178 of the fluid lines 164, 166. As such, the pressure relief valve 136 may provide a means for transferring hydraulic fluid between the fluid lines 164, 166 when the pressure within either fluid line 164, 166 exceeds the relief pressure setting associated with the pressure relief valve 136. For instance, when the fluid pressure within each fluid line 164, 166 is below the relief pressure setting for the pressure relief valve 136, the valve 136 may remain in a closed position so as to fluidly isolate the first fluid line 164 from the second fluid line 166. However, when the fluid pressure within the first fluid line 164 exceeds the relief pressure setting, the pressure relief valve 136 may be configured to be opened in a manner that allows hydraulic fluid within the first fluid line 164 to flow through the valve 136 to the second fluid line 166. Similarly, when the fluid pressure within the second fluid line 166 exceeds the relief pressure setting, the pressure relief valve 136 may be configured to be opened in a manner that allows hydraulic fluid within the second fluid line 166 to flow through the valve 136 to the first fluid line 164.

It should be appreciated that, in several embodiments, the pressure relief valve 136 may correspond to any suitable electronically controllable valve (and/or any suitable combination of electronically controllable valves) that allows the disclosed system 100 to function as described herein, such as an electronically controlled, dual-acting pressure relief valve. In such embodiments, the controller 130 may be configured to electronically control the operation of the pressure relief valve 136 based on the fluid pressure within each fluid line 164, 166. For instance, as shown in FIG. 5, the controller 130 may be communicatively coupled to one or more pressure sensors 180 provided in fluid communication with each fluid line 164, 166. Thus, by monitoring the fluid pressure within each fluid line 164, 166 and comparing such fluid pressure to the relief pressure setting for the pressure relief valve 136, the controller 130 may be configured to control the operation of the pressure relieve valve 136 to allow fluid to be transferred between the fluid lines 164, 166 when the fluid pressure within one of the fluid lines 164, 166 exceeds the pressure relief setting.

Additionally, by configuring the pressure relief valve 136 as an electronically controlled valve, the relief pressure setting for the valve 136 may, for example, be automatically adjusted by the controller 130 based on inputs received from the operator. For instance, based on the desired sensitivity or spring rate for the system 100, the operator may provide a suitable operator input (e.g., via an input device housed within the cab 22) instructing the controller 130 to increase or decrease the relief pressure setting for the valve 136. Upon receipt of the operator input, the controller 130 may then adjust the relief pressure setting stored within its memory to the desired relief pressure. Thereafter, the controller 130 may monitor the fluid pressure within each fluid line 164, 166 (e.g., via the pressure sensors 180) relative to the new relief pressure setting.

Referring still to FIG. 5, by fluidly coupling the pump 34 to the tilt cylinders 102, 104 via the fluid circuit 160, the controller 130 may be configured to implement an active control mode for the disclosed system 100 within which the controller 130 actively controls the actuation/retraction of the tilt cylinders 102, 104 via electronic control of the operation of the control valve(s) 132, thereby allowing the controller 130 to automatically adjust the lateral orientation of the header 32. Specifically, when it is desired to pivot the header 32 about the pivot point 110 in the first pivot direction (indicated by arrow 112 in FIG. 5), the operation of the control valve(s) 132 may be controlled such that pressurized hydraulic fluid is supplied from the pump 134 through the valve(s) 132 to the first fluid line 164. In such instance, the pressurized fluid supplied through the first fluid line 164 may be delivered to both the cap-side chamber 148 of the first tilt cylinder 102 and the rod-side chamber 154 of the second tilt cylinder 104, thereby causing the header 32 to be pivoted in the first direction 112 (e.g., due to retraction of the piston rod 146 of the first tilt cylinder 102 and extension of the piston rod 146 of the second tilt cylinder 104). Similarly, when it is desired to pivot the header 32 about the pivot point 110 in the second pivot direction (indicated by arrow 114 in FIG. 5), the operation of the control valve(s) 132 may be controlled such that pressurized hydraulic fluid is supplied from the pump 134 through the valve(s) 132 to the second fluid line 166. In such instance, the pressurized fluid supplied through the second fluid line 166 may be delivered to both the rod-side chamber 150 of the first tilt cylinder 102 and the cap-side chamber 152 of the second tilt cylinder 104, thereby causing the header 32 to be pivoted in the second direction 114 (e.g., due to extension of the piston rod 146 of the first tilt cylinder 102 and retraction of the piston rod 146 of the second tilt cylinder 104). In one embodiment, the controller 130 may be configured to implement such active control of the retraction/extension of the tilt cylinder 102, 104 based on feedback provided by one or more sensors, such as sensor feedback from the height sensors 116, 118 shown in FIG. 204 or sensor feedback from any other suitable sensors (e.g., one or more orientation sensors, load sensors, and/or the like).

It should be appreciated that the control valve(s) 132 may generally correspond to any suitable electronically controllable valve (and/or any suitable combination of electronically controllable valves) that allows the disclosed system 100 to function as described herein. For instance, in one embodiment, the control valve(s) 132 may correspond to a spring-centered, pilot-operated directional control valve. In such an embodiment, the control valve(s) 132 may include a valve spool (not shown) configured to be actuated between various different valve positions to allow hydraulic fluid to be supplied from the pump 132 to either fluid line 164, 166 when desired and to also allow the supply of hydraulic fluid from the pump 134 to be cut-off (e.g., when the control valve(s) 132 is located at its closed or neutral position).

Additionally, as indicated above, the disclosed system 100 may also include a free-float or passive control mode in which the header 32 is allowed to "float" relative to the ground and tilt laterally to accommodate changes in the contour or elevation of the ground. To implement the passive control mode, the controller 130 may be configured to control the operation of the control valve(s) 132 such that the supply of pressurized hydraulic fluid from the pump 134 is cut-off (e.g., by moving the valve(s) 132 to its closed or neutral position), thereby creating a closed-loop circuit between the first and second fluid lines 164, 166 across the pressure relief valve 136. Thereafter, when the "free-floating" header 32 contacts the ground, a moment force may be applied through the header 32 that, in turn, results in an increase in the fluid pressure within either the first fluid line 164 or the second fluid line 166 depending on the rotational direction of the force (e.g., either the first direction 112 or the second direction 114). In the event that the increase in pressure in the associated fluid line 164, 166 exceeds the relief pressure setting selected for the pressure relief valve 136, the pressure relief valve 136 may be opened to allow fluid to be transferred from the high pressure line to the low pressure line, thereby permitting the header 32 to pivot relative to the feeder 34 about the pivot point 110 in the corresponding rotational direction of the applied force. Alternatively, if the increase in pressure in the associated fluid line 154, 166 does not exceed the relief pressure setting, the pressure relief valve 136 may remain closed, thereby preventing the header 32 from pivoting relative to the feeder 34. Thus, as indicated above, the specific relief pressure setting selected for the pressure relief valve 136 may serve to define the "float" sensitivity or spring rate for the system 100.

Figure 6:
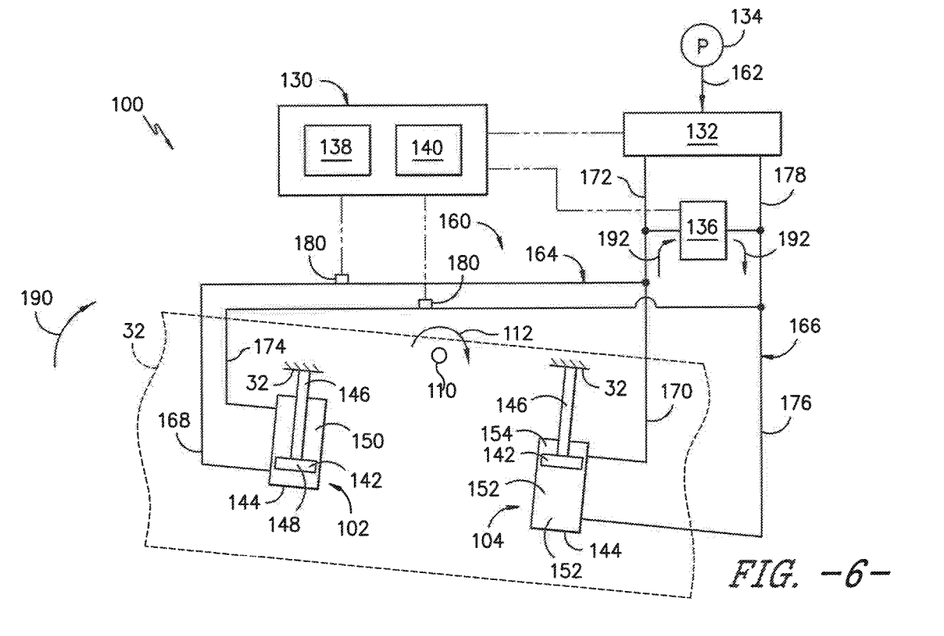
FIG. 6 illustrates another schematic view of the lateral tilt control system shown in FIG. 5, particularly illustrating the header pivoted relative to the feeder in the first direction during implementation of a passive control mode of the disclosed system.

Referring now to FIG. 6, an example implementation of the above-described free-float or passive control mode is illustrated in accordance with aspects of the present subject matter. In the illustrated embodiment, a moment force (e.g., as indicated by arrow 190) is being applied through the header 32 that is associated with pivoting the header 32 relative to the feeder 34 in the first direction 112, such as when the first lateral end 106 of the header 32 contacts the ground. As a result, the fluid pressure within the first fluid line 164 may be increased as the force is transferred through the lift cylinders 102, 104. Assuming that the force is sufficient to increase the fluid pressure within the first fluid line 164 to a pressure exceeding the relief pressure setting for the pressure relief valve 136, the controller 130 may be configured to open the pressure relief valve 136 to allow the high pressure fluid contained within the first fluid line 164 to flow to the second fluid line 166 (e.g., as indicated by arrows 192 in FIG. 6). Such fluid exchange between the fluid lines 164, 166 may result in the piston rod 146 of the first tilt cylinder 102 retracting and the piston rod 146 of the second tilt cylinder 104 extending to pivot the header 32 relative to the feeder 34 in the first direction 112.

It should be appreciated that system 100 may be configured to operate similarly when the moment force applied through the header 32 that is associated with pivoting the header 32 relative to the feeder 34 in the opposite direction (i.e., the second direction 114). In such instance, assuming that the force is sufficient to increase the fluid pressure within the second fluid line 166 to a pressure exceeding the relief pressure setting for the pressure relief valve 136, the controller 130 may be configured to open the pressure relief valve 136 to allow the high pressure fluid contained within the second fluid line 166 to flow to the first fluid line 166. Such fluid exchange between the fluid lines 164, 166 may result in the piston rod 146 of the first tilt cylinder 102 extending and the piston rod 146 of the second tilt cylinder 104 retracting to pivot the header 32 relative to the feeder 34 in the second direction 114.

Figure 7:
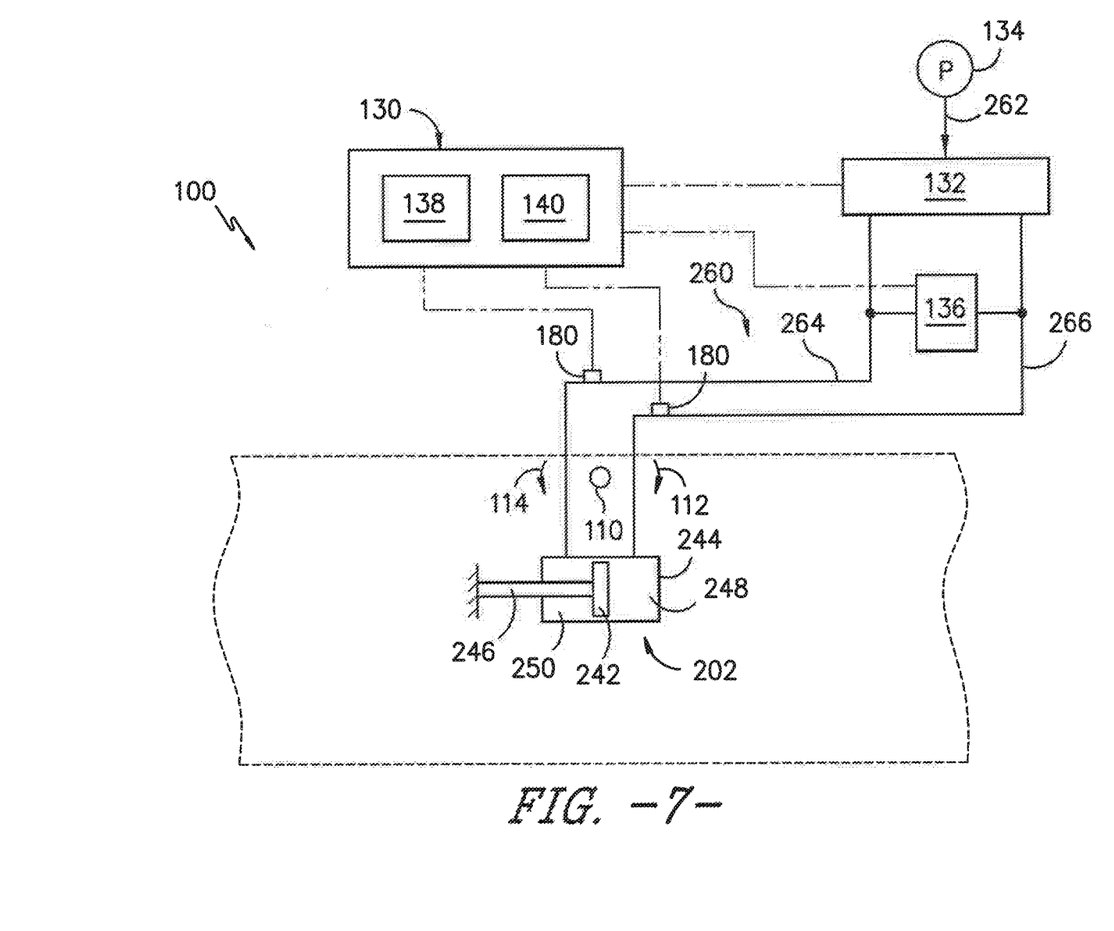
FIG. 7 illustrates a schematic view of another embodiment of a lateral tilt control system for an agricultural harvester in accordance with aspects of the present subject matter.

It should also be appreciated that, in alternative embodiments, the disclosed system may be operated in both its active control mode and its passive control mode utilizing a single tilt cylinder as opposed to a pair of tilt cylinders. For example, FIG. 7 illustrates an alternative embodiment of the system 100 described above in which a single tilt cylinder 202 is coupled between the header 32 and the feeder 34. As shown, the tilt cylinder 202 may be configured similar to the tilt cylinders 102, 104 described above. For instance, the tilt cylinder 202 may include a piston 242 encased within an associated cylinder housing 244 and a piston rod 246 extending outwardly from the housing 244. Additionally, the cylinder 202 may define opposed cylinder chambers along either side of its piston 242. For instance, as shown in FIG. 6, the tilt cylinder 202 may include both a cap-side chamber 248 and a rod-side chamber 250.

Additionally, the system 100 may also include a fluid circuit 260 providing a fluid coupling or path between the pump 134 and the tilt cylinder 202. For instance, as shown in FIG. 7, the pump 134 may be fluidly coupled to the control valve(s) 132 via one or more pump lines 262 to allow pressurized hydraulic fluid to be supplied from the pump 134 to the control valve(s) 132. Additionally, the control valve(s) 132 may be fluidly coupled to the tilt cylinder 102 via first and second fluid lines 264, 166. For instance, as shown in FIG. 7, the first fluid line 264 may be configured to provide a fluid path between the control valve(s) 132 and the rod-side chamber 250 of the tilt cylinder 202. Similarly, the second fluid line 266 may be configured to provide a fluid path between the control valve(s) 132 and the cap-side chamber 248 of the tilt cylinder 202.

In the embodiment shown in FIG. 7, the active and passive control modes may be implemented similar to that described above with reference to FIGS. 5 and 6. Specifically, when in the active control mode, the controller 130 may be configured to actively control the actuation/retraction of the tilt cylinder 202 via electronic control of the operation of the control valve(s) 132, thereby allowing the controller 130 to automatically adjust the lateral orientation of the header 32. Specifically, when it is desired to pivot the header 32 about the pivot point 110 in the first pivot direction (indicated by arrow 112 in FIG. 7), the operation of the control valve(s) 132 may be controlled such that pressurized hydraulic fluid is supplied from the pump 134 through the valve(s) 132 to the first fluid line 264. In such instance, the pressurized fluid supplied through the first fluid line 364 may be delivered to the rod-side chamber 250 of the tilt cylinder 202, thereby causing the header 32 to be pivoted in the first direction 112. Similarly, when it is desired to pivot the header 32 about the pivot point 110 in the second pivot direction (indicated by arrow 114 in FIG. 7), the operation of the control valve(s) 132 may be controlled such that pressurized hydraulic fluid is supplied from the pump 134 through the valve(s) 132 to the second fluid line 266. In such instance, the pressurized fluid supplied through the second fluid line 266 may be delivered to the cap-side chamber 248 of the tilt cylinder 202, thereby causing the header 32 to be pivoted in the second direction 114.

Moreover, when in the passive control mode, the controller 130 may be configured to control the operation of the control valve(s) 132 such that the supply of pressurized hydraulic fluid from the pump 134 is cut-off (e.g., by moving the valve(s) 132 to its closed or neutral position), thereby creating a closed-loop circuit between the first and second fluid lines 264, 266 across the pressure relief valve 136. Thereafter, when the "free-floating" header 32 contacts the ground, a moment force may be applied through the header 32 that, in turn, results in an increase in the fluid pressure within either the first fluid line 264 or the second fluid line 266 depending on the rotational direction of the force (e.g., either the first direction 112 or the second direction 114). In the event that the increase in pressure in the associated fluid line 264, 266 exceeds the relief pressure setting selected for the pressure relief valve 136, the pressure relief valve 136 may be opened to allow fluid to be transferred from the high pressure line to the low pressure line, thereby permitting the header 32 to pivot relative to the feeder 34 about the pivot point 110 in the corresponding rotational direction of the applied force.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lateral tilt control system for an agricultural harvester including a support structure and an implement pivotally coupled to the support structure, the system comprising:
   a first tilt cylinder coupled between the support structure and the implement, the first tilt cylinder including a first cap-side chamber and a first rod-side chamber;
   a second tilt cylinder coupled between the support structure and the implement, the second tilt cylinder including a second cap-side chamber and a second rod-side chamber;
   a first fluid line providing a flow path between the first cap-side chamber of the first tilt cylinder and the second rod-side chamber of the second tilt cylinder to fluidly couple the first cap-side chamber to the second rod-side chamber;
   a second fluid line providing a flow path between the first rod-side chamber of the first tilt cylinder and the second cap-side chamber of the second tilt cylinder to fluidly couple the first rod-side chamber to the second cap-side chamber; and
   a pressure relief valve coupled between the first and second fluid lines, the pressure relief valve being configured to be opened to allow fluid to be transferred between the first and second fluid lines when a fluid pressure within one of the first fluid line and the second fluid line exceeds a relief pressure setting associated with the pressure relief valve.

2. The system of claim 1, wherein, when the fluid pressure within the first fluid line exceeds the relief pressure setting, fluid contained within the first fluid line is transferred through the relief pressure valve to the second fluid line to allow the implement to pivot relative to the support structure in a first direction.

3. The system of claim 2, wherein, when the fluid pressure within the second fluid line exceeds the relief pressure setting, fluid contained within the second fluid line is transferred through the relief pressure valve to the first fluid line to allow the implement to pivot relative to the support structure in a second direction opposite the first direction.

4. The system of claim 1, further comprising a controller communicatively coupled to the pressure relief valve, the controller being configured to electronically control operation of the pressure relief valve based on the relief pressure setting.

5. The system of claim 4, wherein the controller is configured to adjust the relief pressure setting associated with the pressure relief valve based on inputs received from an operator of the agricultural harvester.

6. The system of claim 4, further comprising at least one pressure sensor provided in flow communication with each of the first and second fluid lines, the controller being further configured to monitor the fluid pressure within the first and second fluid lines based on sensor measurements provided by the at least one pressure sensor and compare the monitored fluid pressure to the relief pressure setting associated with the pressure relief valve.

7. The system of claim 1, further comprising at least one control valve provided in flow communication with the first and second fluid lines, the at least one control valve being configured to regulate a supply of fluid from a pressurized fluid source to the first and second fluid lines.

8. The system of claim 7, wherein the at least one control valve is configured to cut-off the supply of fluid from the pressurized fluid source when the first and second tilt cylinders are operating in a passive control mode to form a closed-loop fluid circuit between the first and second fluid lines across the pressure relief valve.

9. The system of claim 1, wherein the implement is configured to pivot relative to the support structure about a pivot point, the first and second tilt cylinders being positioned on opposite lateral sides of the pivot point.

10. The system of claim 1, wherein the implement comprises a header of the agricultural harvester and the support structure comprises a feeder of the agricultural harvester.

11. An agricultural harvester, comprising:
a feeder;
a header pivotally coupled to the feeder; and
a lateral tilt control system configured to allow the header to pivot relative to the feeder to adjust a lateral orientation of the header, the lateral tilt control system comprising:
a first tilt cylinder coupled between the header and the feeder, the first tilt cylinder including a first cap-side chamber and a first rod-side chamber;
a second tilt cylinder coupled between the header and the feeder, the second tilt cylinder including a second cap-side chamber and a second rod-side chamber;
a first fluid line providing a flow path between the first cap-side chamber of the first tilt cylinder and the second rod-side chamber of the second tilt cylinder to fluidly couple the first cap-side chamber to the second rod-side chamber;
a second fluid line providing a flow path between the first rod-side chamber of the first tilt cylinder and the second cap-side chamber of the second tilt cylinder to fluidly couple the first rod-side chamber to the second cap-side chamber; and
a pressure relief valve coupled between the first and second fluid lines, the pressure relief valve being configured to be opened to allow fluid to be transferred between the first and second fluid lines when a fluid pressure within one of the first fluid line and the second fluid line exceeds a relief pressure setting associated with the pressure relief valve.

12. The agricultural harvester of claim 11, wherein, when the fluid pressure within the first fluid line exceeds the relief pressure setting, fluid contained within the first fluid line is transferred through the relief pressure valve to the second fluid line to allow the header to pivot relative to the feeder in a first direction.

13. The agricultural harvester of claim 12, wherein, when the fluid pressure within the second fluid line exceeds the relief pressure setting, fluid contained within the second fluid line is transferred through the relief pressure valve to the first fluid line to allow the header to pivot relative to the feeder in a second direction opposite the first direction.

14. The agricultural harvester of claim 11, further comprising a controller communicatively coupled to the pressure relief valve, the controller being configured to electronically control operation of the pressure relief valve based on the relief pressure setting.

15. The agricultural harvester of claim 14, wherein the controller is configured to adjust the relief pressure setting associated with the pressure relief valve based on inputs received from an operator of the agricultural harvester.

16. The agricultural harvester of claim 14, further comprising at least one pressure sensor provided in flow communication with each of the first and second fluid lines, the controller being further configured to monitor the fluid pressure within the first and second fluid lines based on sensor measurements provided by the at least one pressure sensor and compare the monitored fluid pressure to the relief pressure setting associated with the pressure relief valve.

17. The agricultural harvester of claim 11, further comprising at least one control valve provided in flow communication with the first and second fluid lines, the at least one control valve being configured to regulate a supply of fluid from a pressurized fluid source to the first and second fluid lines.

18. The agricultural harvester of claim 17, wherein the at least one control valve is configured to cut-off the supply of fluid from the pressurized fluid source when the first and second tilt cylinders are operating in a passive control mode to form a closed-loop fluid circuit between the first and second fluid lines across the pressure relief valve.

19. The agricultural harvester of claim 11, wherein the header is configured to pivot relative to the feeder about a pivot point, the first and second tilt cylinders being positioned on opposite lateral sides of the pivot point.

* * * * *